(12) United States Patent
Privitelli

(10) Patent No.: US 10,494,044 B2
(45) Date of Patent: Dec. 3, 2019

(54) CENTER KICKSTAND WITH SHARED, PIVOT AXLE FOR TWO-WHEELED VEHICLE

(71) Applicant: Greg Privitelli, Wilmington, CA (US)

(72) Inventor: Greg Privitelli, Wilmington, CA (US)

(*) Notice: Subject to any disclaimer, the term of this patent is extended or adjusted under 35 U.S.C. 154(b) by 0 days.

(21) Appl. No.: 16/108,082

(22) Filed: Aug. 21, 2018

(65) Prior Publication Data

US 2019/0144058 A1 May 16, 2019

Related U.S. Application Data

(60) Provisional application No. 62/584,717, filed on Nov. 10, 2017.

(51) Int. Cl.
*B62H 1/02* (2006.01)
*B62H 1/04* (2006.01)

(52) U.S. Cl.
CPC .................... *B62H 1/04* (2013.01)

(58) Field of Classification Search
CPC .............. B62H 1/00; B62H 1/02; B62H 1/04
USPC ......................................... 280/293, 301, 302
See application file for complete search history.

(56) References Cited

U.S. PATENT DOCUMENTS

| | | | | |
|---|---|---|---|---|
| 656,129 A * | 8/1900 | Weston | ............. | B62H 1/02 280/302 |
| 690,221 A * | 12/1901 | Jensen | ............. | B62H 1/02 280/302 |
| 2,791,441 A * | 5/1957 | Phillips | ............. | B62H 1/02 280/302 |
| 3,039,792 A * | 6/1962 | Wood | ............. | B62H 1/02 280/302 |
| 5,388,848 A * | 2/1995 | Silva | ............. | B62H 1/02 280/300 |
| 6,412,805 B1 * | 7/2002 | Chen | ............. | B62H 1/04 280/302 |
| 2008/0203701 A1 * | 8/2008 | Adams | ............. | B62H 1/04 280/302 |
| 2008/0296865 A1 * | 12/2008 | Canetti | ............. | B62H 1/02 280/301 |
| 2010/0283222 A1 * | 11/2010 | Lin | ............. | B62H 1/04 280/303 |

* cited by examiner

*Primary Examiner* — Tony H Winner

(57) ABSTRACT

A center mounted kickstand for a two-wheeled vehicle with a swing arm rear suspension includes a rotatable apparatus, and a pivot axle. The rotatable apparatus is mounted onto a mainframe of the two-wheeled vehicle via the pivot axle, and the pivot axle is mounted transversely to a longitudinal plane of the two-wheeled and connects the swing arm to the two-wheeled vehicle. The rotatable apparatus is constructed to slide in both directions transverse the longitudinal plane of the two-wheeled vehicle on the pivot axle.

5 Claims, 11 Drawing Sheets

CENTER KICKSTAND WITH SHARED, PIVOT AXLE FOR TWO-WHEELED VEHICLE

CROSS-REFERENCE TO RELATED APPLICATIONS

This application claims the benefit of U.S. Provisional Patent Application No. 62/584,717, filed Nov. 10, 2017, the contents of which are incorporated herein by reference.

FIELD

The present disclosure relates to a two-legged, center mounted kickstand for two-wheeled vehicles with a rear swing arm suspension system that can be used on motorcycles, motor scooters, bicycles, and mopeds.

BACKGROUND

Two conventional types of kickstands are a single-leg kickstand and a two-legged kickstand. The single-leg kickstand (also known as a "side stand") typically includes one of two mounting mechanisms. The first is an independent, self-contained mechanism mounted on a mainframe of a two-wheeled vehicle by a removably attachable clamp. The second is more integral to the mainframe, mounted using a welded-on tab upon which the pivoting end of the leg is secured with a single bolt. Both of these mounting structures achieve a leg-retracted position with the leg set alongside or underneath the mainframe and held in place by a spring. For the leg-deployed or usable position, the leg is swingable downwardly and outwardly from the frame by a rider's foot and held in place with the spring, with the free end of the leg being slightly elevated from the ground. When the vehicle is allowed by the rider to lean in a direction of the deployed side stand, the leg contacts the ground and the vehicle is supported. However, because the side stand typically has a considerably small contact area on the ground and because the vehicle is set into an off-kilter orientation while parked, the balance of the vehicle being dependent on the leg may be insecure. In particular, in a situation where the weight of the vehicle is set directly over the leg, the leg may be driven into a surface with insufficient support, such as gravel or dirt, to sustain the vehicle in a parked position.

The two-legged kickstand (also known as a "center stand") is secured to the mainframe similarly to the side stand, either by an independent, removably attachable clamp or welded-on tabs, and functions correspondingly to the side stand with leg-retracted and leg-deployed positions. Unlike the side stand, however, the center stand supports the vehicle in an upright, non-leaning orientation which can provide a greater stability to the parked vehicle on any surface. Also, the center stand can be situated at any location on the mainframe for attachment from far forward to far rearward without consequence to the fore and aft or side-to-side balance of the vehicle while parked. However, the center stand may not be useable on some vehicles. This is because the legs operate as a single unit and are attached to a pivotable cylindrical shaft that extends transversely to the longitudinal plane, and thus, may be incompatible with components that extend on the longitudinal plane, such as the exhaust pipe or muffler. Also, the twin legs may present conflicts with components outside the mainframe such as footrests or the swing arm when swinging up and down while the vehicle is in motion.

BRIEF DESCRIPTION OF THE DRAWINGS

The embodiments herein are illustrated by way of example and not by way of limitation in the figures of the accompanying drawings in which like references indicate similar elements. It should be noted that references to "an" or "one" embodiment of the disclosure are not necessarily to the same embodiment, and they mean at least one. Also, in the interest of conciseness and reducing the total number of figures, a given figure may be used to illustrate the features of more than one embodiment of the disclosure, and not all elements in the figure may be required for a given embodiment.

FIG. 1 FIGS. 1a, 1b, 2a, 2b, 3a, 3b, 3c, 3d, 4, 5a and 5b each show conventional kickstands.

FIG. 9a illustrates another view of the center kickstand shown in FIG. 7a, with legs of the center kickstand deployed and with ancillaries and components not shown, according to an example embodiment.

FIG. 9b illustrates a same view of the center kickstand as shown FIG. 9a, with legs of the center kickstand shown in a retracted position and resulting differences of features of one component.

DETAILED DESCRIPTION

Figure 1A:
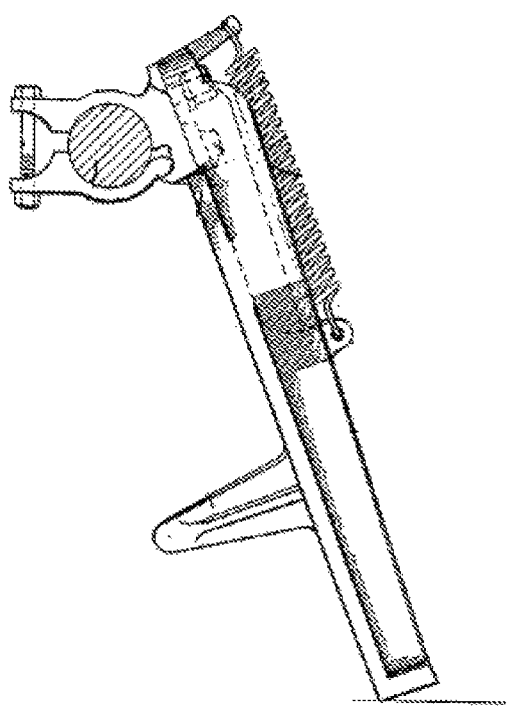
Figure 1B:
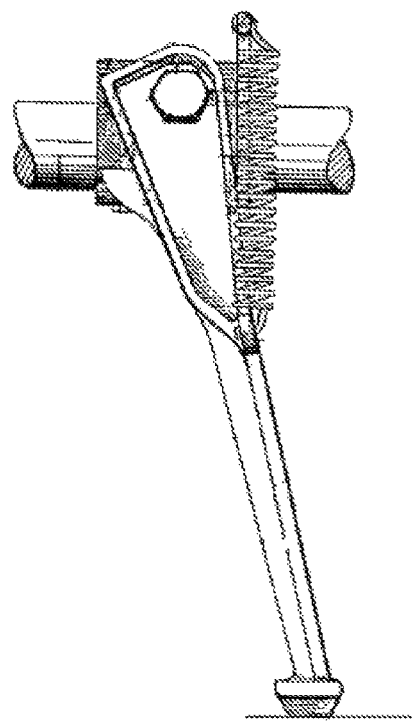
Figure 2A:
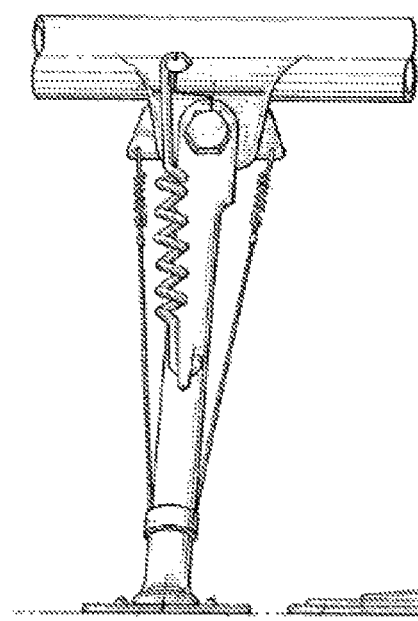
Figure 2B:
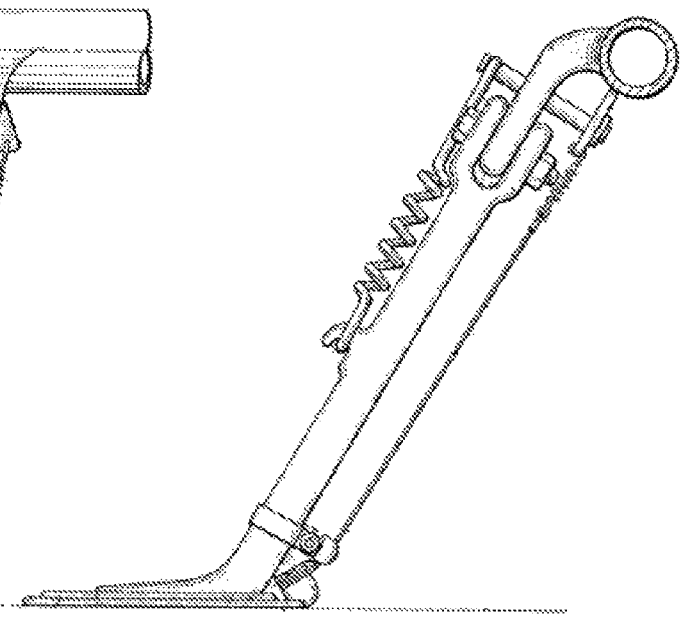
Figure 3A:
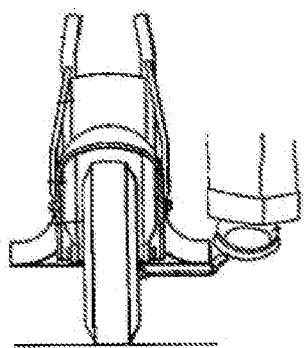
Figure 3B:
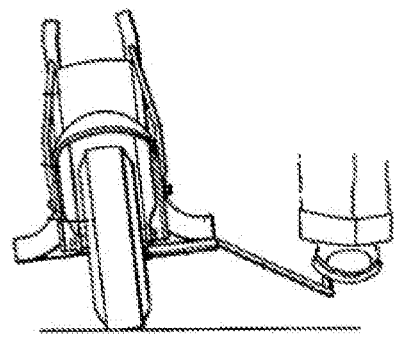
Figure 3C:
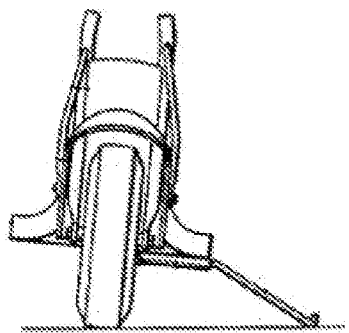
Figure 3D:
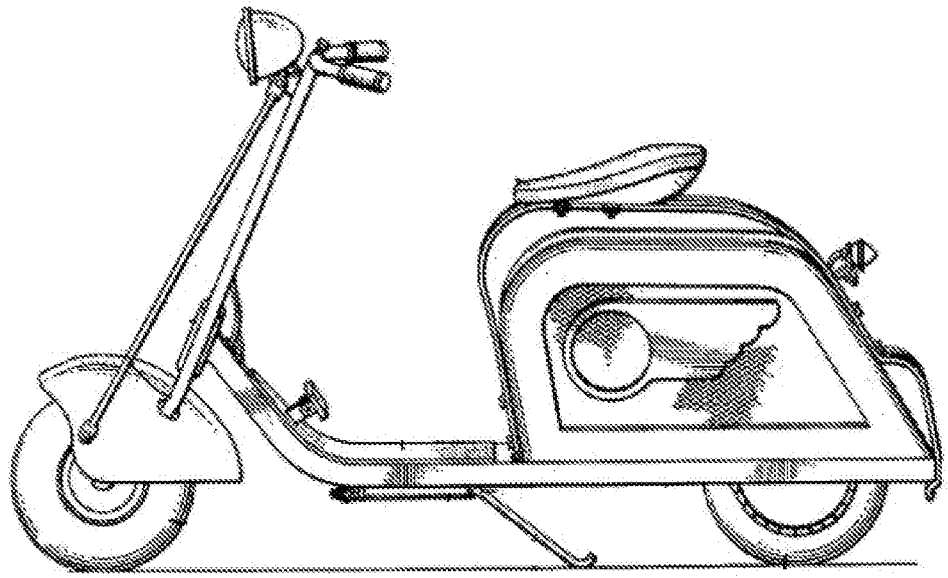
Figure 4:
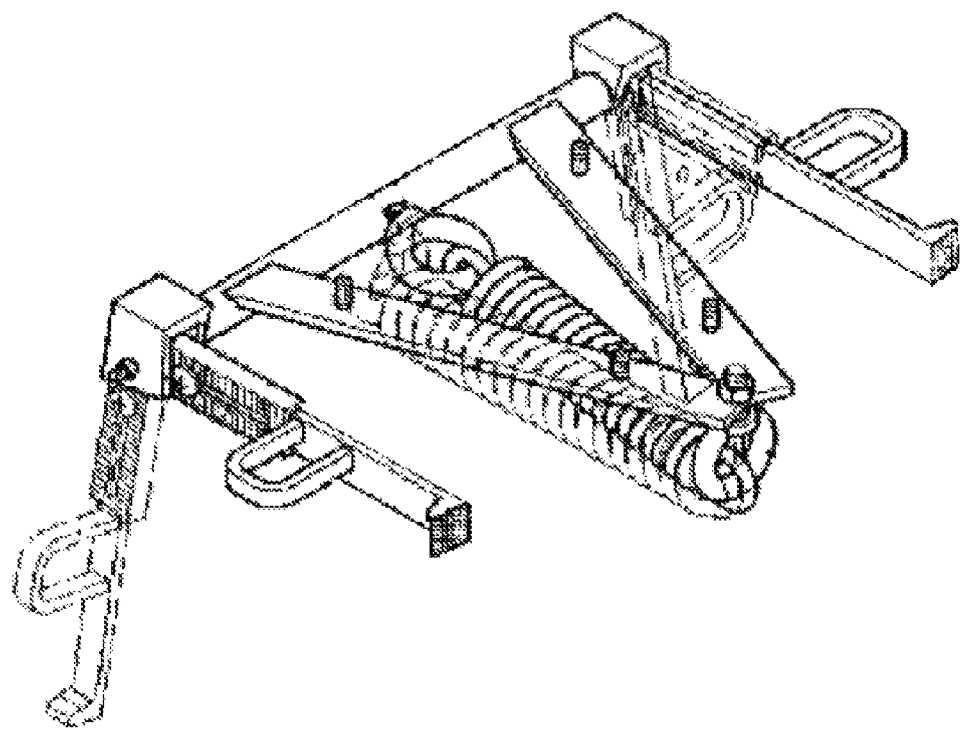
Figure 5A:
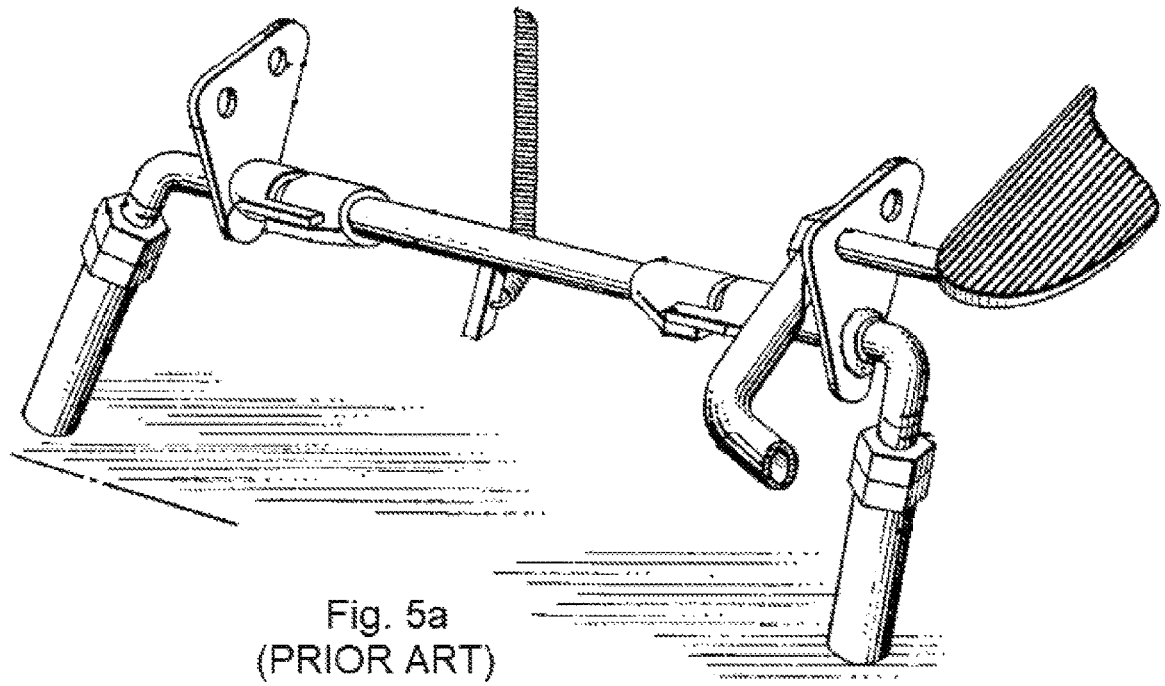
Figure 5B:
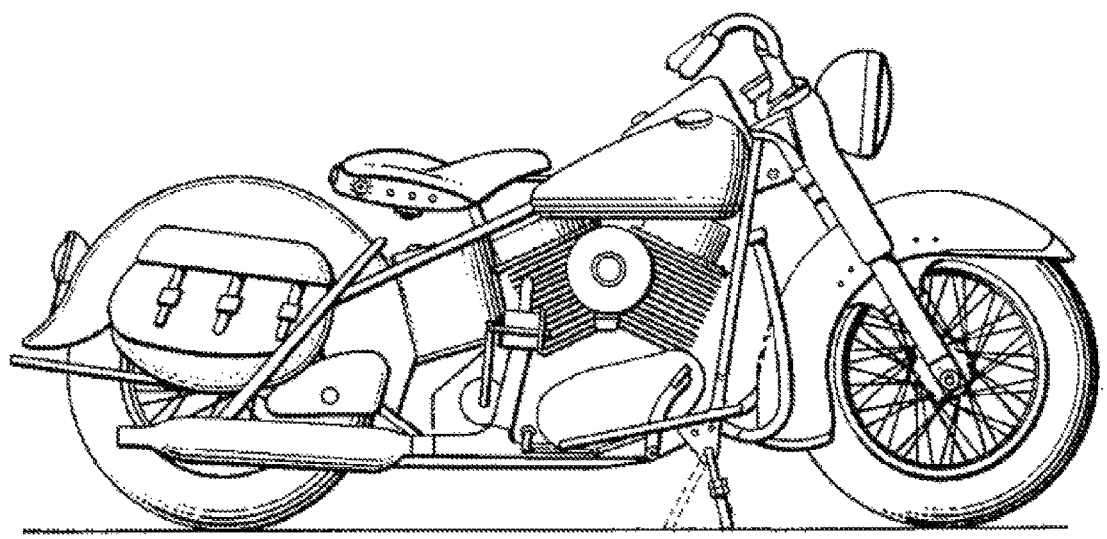
Figure 6A:
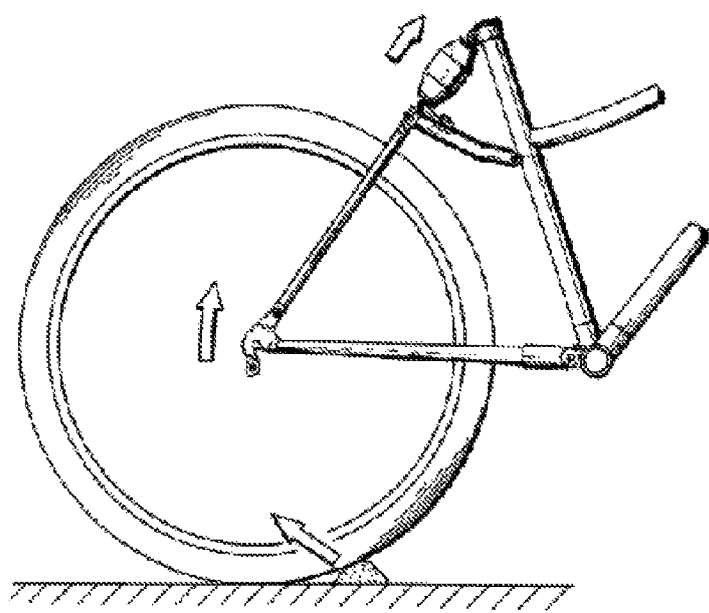
FIGS. 6a and 6b each show conventional swing arms.
Figure 6B:
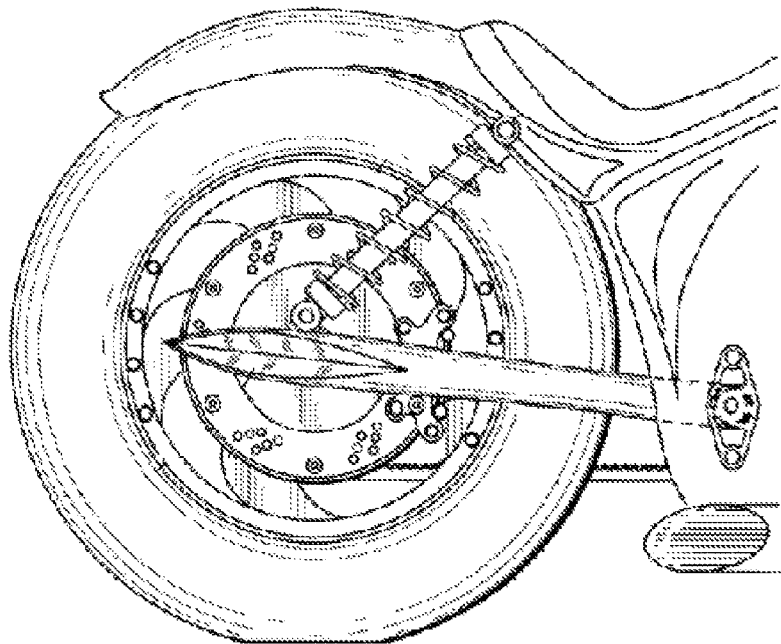

Various embodiments and aspects of the disclosure herein will be described with reference to details discussed below, and the accompanying figures will illustrate the various embodiments. The following description and figures are illustrative of the disclosure herein and are not to be construed as limiting. Numerous specific details are described to provide a thorough understanding of various embodiments. However, it is understood that embodiments disclosed herein may be practiced without these specific details. In certain instances, well-known or conventional details, such as structures and techniques, are not described in order to provide a concise discussion of example embodiments.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

The inventor herein has found that a rear suspension swing arm can provide a smoother experience to a rider of a two-wheeled vehicle because of a sub-frame assembly fixed on a pivot connection to a rearward end of the mainframe of the two-wheeled vehicle. Depending upon the design of the rear suspension swing arm, it includes either one or two arms that extend rearwardly to which the rear wheel assembly is mounted. Again, depending on the design, one shock absorber or two, (each) fitted with a coil-over spring or suspension airbag that supports the combined weight of the vehicle and of the rider, is pivotably mounted on the swing arm at a bottom end and pivotably mounted on the mainframe at a top end. Variations of mounting locations for the shocks absorber(s) can be numerous and limited to the positioning of other components that comprise the complete vehicle. While the vehicle is in motion, the shock absorber(s) dampens the forces of up and down swings of the swing arm caused by road surface imperfections.

The disclosure herein addresses the foregoing problems by providing a center kickstand apparatus which is not limited by an independent mounting structure or welded-on tabs such as described above and depicted in conventional kickstands. In particular, and according to one example embodiment, a center mounted kickstand for a two-wheeled vehicle with a swing arm rear suspicion is provided, including two legs, each with an attached foot. The center mount kickstand further includes two flanges to which each leg is attached, respectively. A first flange has sunken relief features which correspond to a component that is contiguous but independent of the center mount kickstand and which has high relief features that correspond to the sunken relief features of the first flange. The center kickstand also includes a pivotable cylindrical shaft to which each flange is attached, and a spring providing both linear and torsional forces.

By virtue of the foregoing described arrangement, it is possible to provide a center kickstand that can be mounted on a mainframe of a two-wheeled vehicle via a same pivot axle of which a swing arm is mounted, and that can move in unison with the swing arm in up and down swings as affected by road surface imperfections while the two-wheeled vehicle is in motion. Furthermore, the foregoing described arrangement can provide the advantageous effect that the center kickstand can be held securely at any speed despite any imperfections of any type of road of either improved or unimproved quality, while remaining independently rotatable when utilized for the primary function of supporting the two-wheeled vehicle in an upright, non-leaning orientation while parked.

Figure 7A:
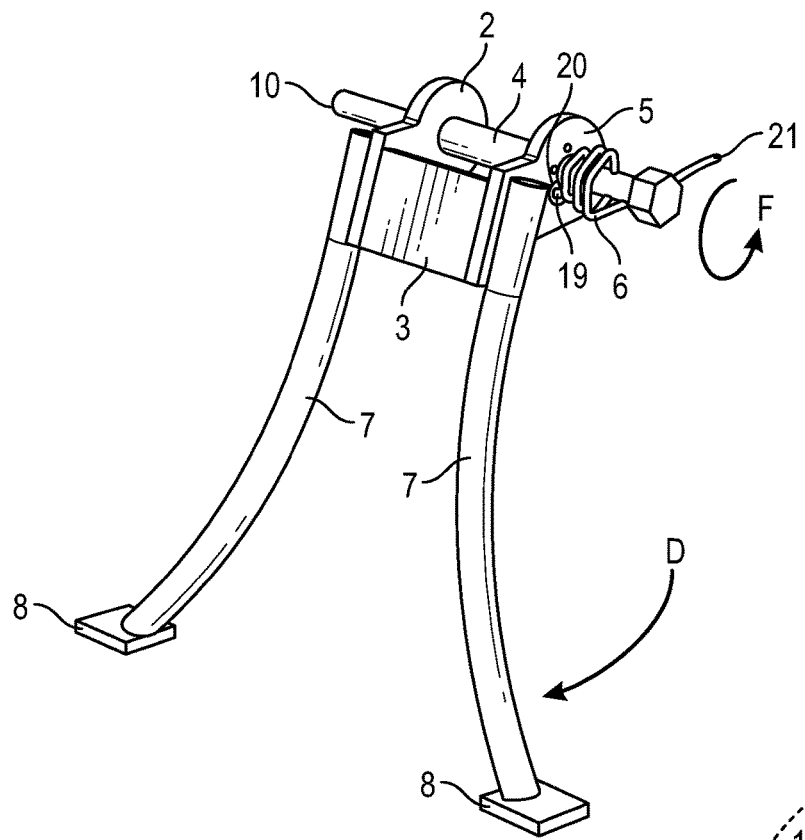
FIG. 7a illustrates a representative view of a center kickstand according to an example embodiment.

Turning to FIG. 7a, FIG. 7a illustrates a representative view of a center kickstand of a two-wheeled vehicle according to an example embodiment herein. FIG. 7a shows the center kickstand assembled as a rotatable apparatus with rotatable components on a pivot axle (10). In particular, the center kickstand includes feet (8) which are attached to legs (7) which are attached to flanges (2,5). A brace (3) and a cylindrical, pivot axle cover (4) are attached between the flanges (2,5). A spring (6) is provided and is constructed in a combination of a torsion type and a linear compression type spring. A dynamic end (19) of the spring (6) fits into a hole (20) in the flange (5) with a 90 degree bend. A body of the spring (6) winds around the pivot axle (10) and an anchoring end (21) of the spring (6) extends at length. According to one example embodiment, the rotatable apparatus is rotated in a clockwise motion (D) to deploy the legs (7) which results in the spring (6) wound tighter and exerting a greater force in a counter-clockwise direction (F).

Figure 7B:
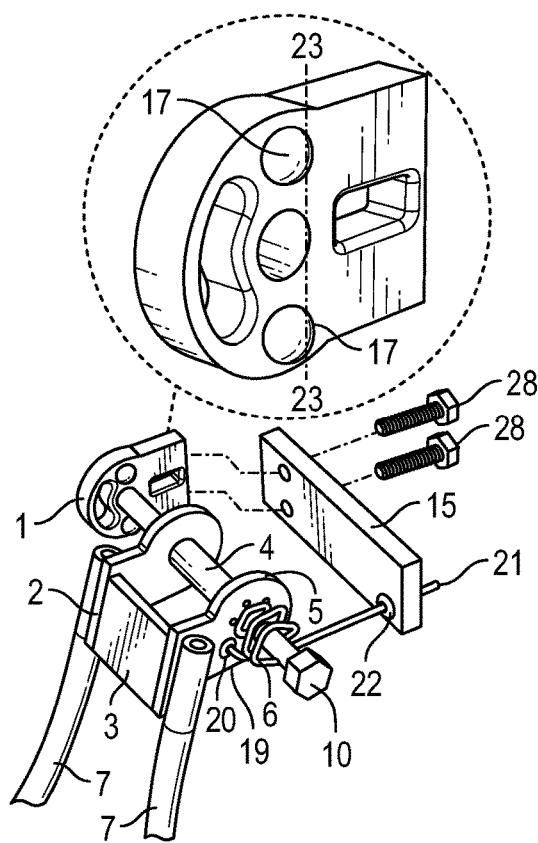
FIG. 7b illustrates another view of the center kickstand shown in FIG. 7a, with an added component shown in an exploded view, and a swing arm component.

FIG. 7b illustrates another view of the center kickstand shown in FIG. 7a, with an added component shown in an exploded view, and a swing arm component. In particular, FIG. 7b shows a stationary component (1) in an exploded view and enlarged to show off two high relief, dome-shaped features (17) bisected at the center points by the vertical plane (23-23). Two screws (28) are shown with paths that secure the stationary component (1) to a cross member (15) of a swing arm (12, shown in FIG. 7c). The anchoring end (21) of the spring (6) extends through a hole (22) in the cross member (15) and moves in unison with the swing arm (12) in up and down swings as it is such affected by road conditions when the two-wheeled vehicle is in motion.

Figure 7C:
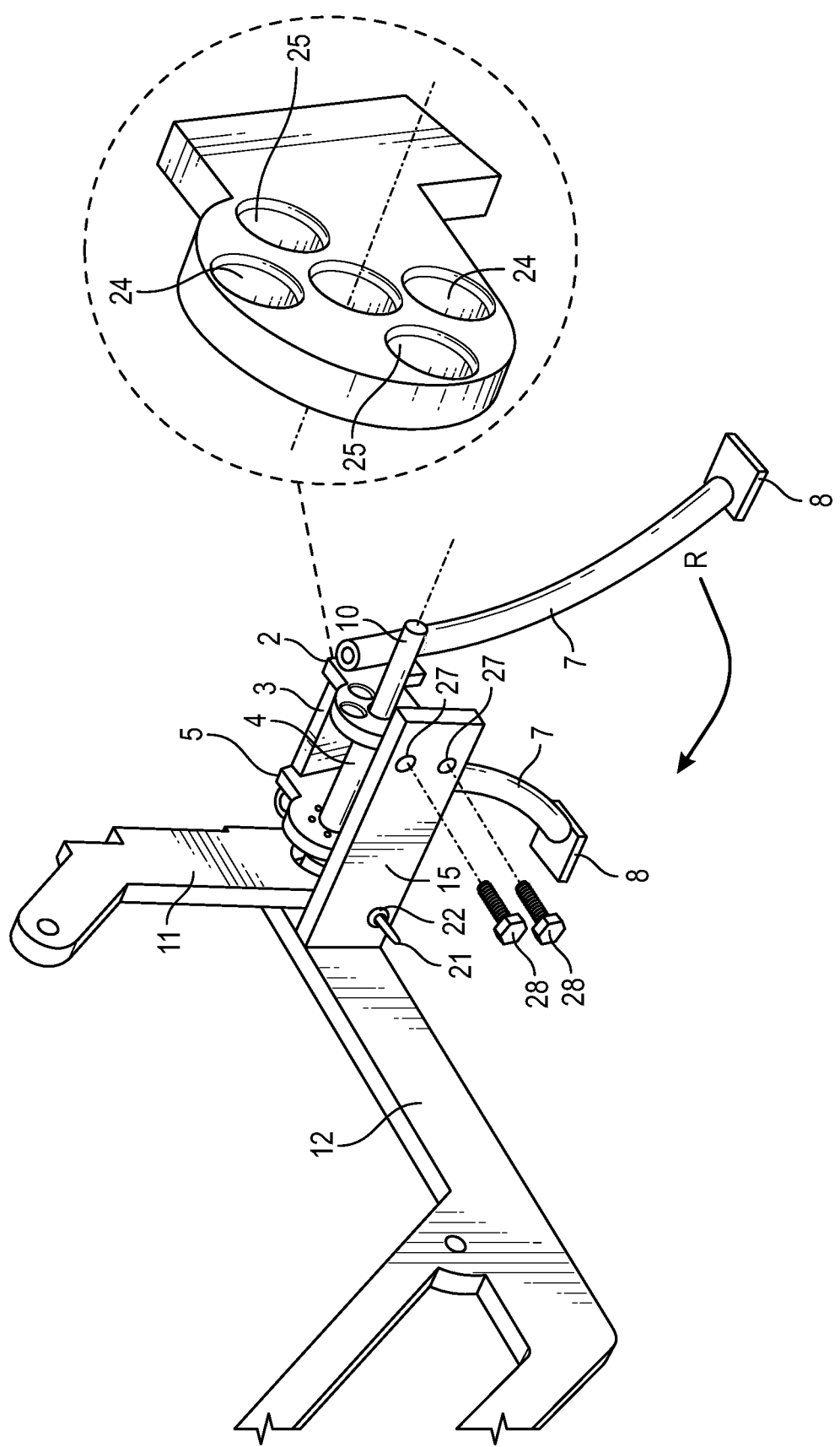
FIG. 7c illustrates a view of the center kickstand shown in FIG. 7a from a reverse angle, with parts of a mainframe and a swing arm shown for reference and one component shown enlarged.

FIG. 7c illustrates a view of the center kickstand shown in FIG. 7a from a reverse angle, with parts of a mainframe (11) and the swing arm (12) shown for reference and the flange 2 shown enlarged. The flange (2) is expanded to show off sunken relief features (24,25) which correspond in size, shape, and positioning to accept the high relief features (17, shown in FIG. 7b).

Figure 8A:
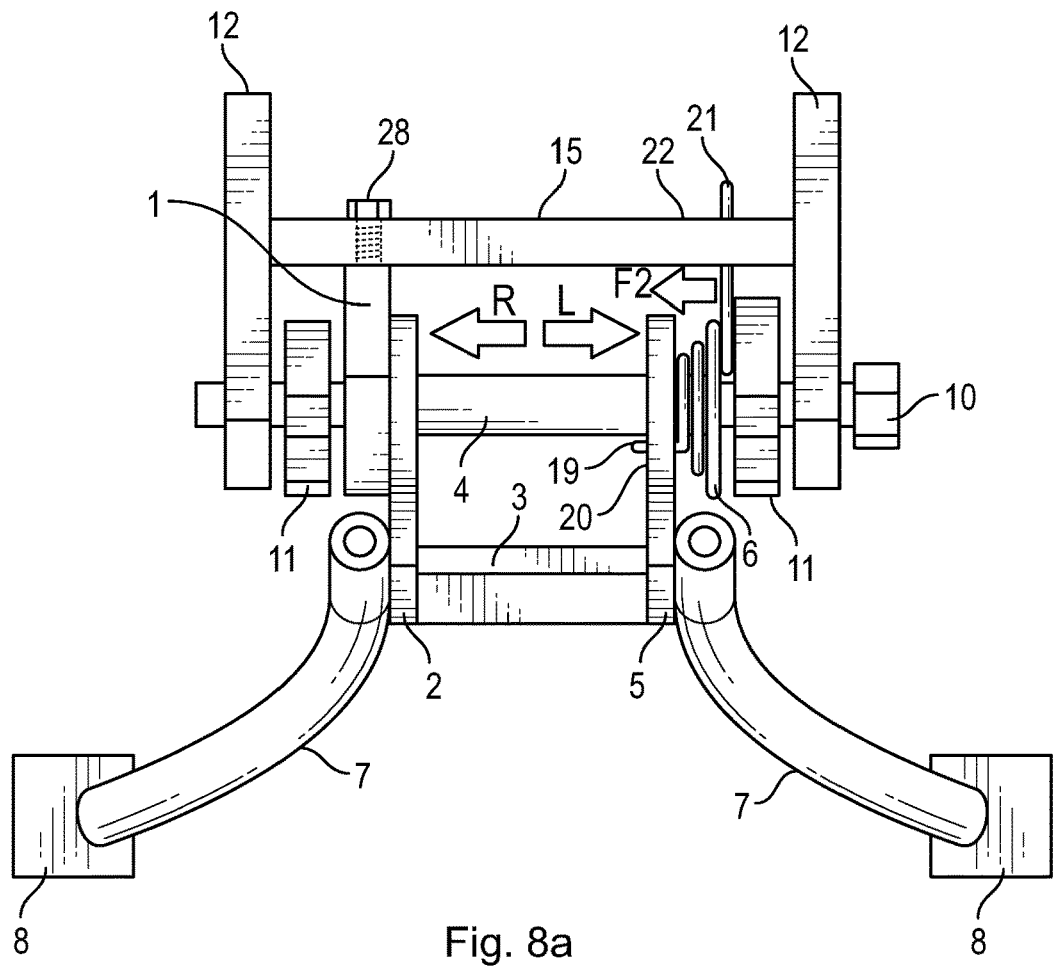
FIG. 8a illustrates an overhead view of the center kickstand shown in FIG. 7a, mounted on a shared, pivot axle in accordance with an example embodiment.

FIG. 8a illustrates an overhead view of the center kickstand shown in FIG. 7a, mounted on a shared, pivot axle in accordance with an example embodiment. In particular, FIG. 8a shows an overhead view of the center kickstand in a legs-deployed position and mounted on the shared, pivot axle (10) with direction arrows (R, L) showing the rotatable apparatus (shown in FIG. 7a) with the capacity for sliding side-to-side on the pivot axle (10). The mainframe (11) supports the spring (6) as a backstop for the spring (6) to exert a constant force (F2) to the rotatable apparatus via contact with the flange (5) by which the rotatable apparatus is pushed in the R direction and held fast at the stationary component (1) upon the flange (2) making contact with the stationary component (1). The stationary component (1) is attached by screws (28) to the cross member (15) and moves in unison with the swing arm (12) about the pivot axle (10) in up and down swings of the swing arm (12) while the two-wheeled vehicle is in motion.

Figure 8B:
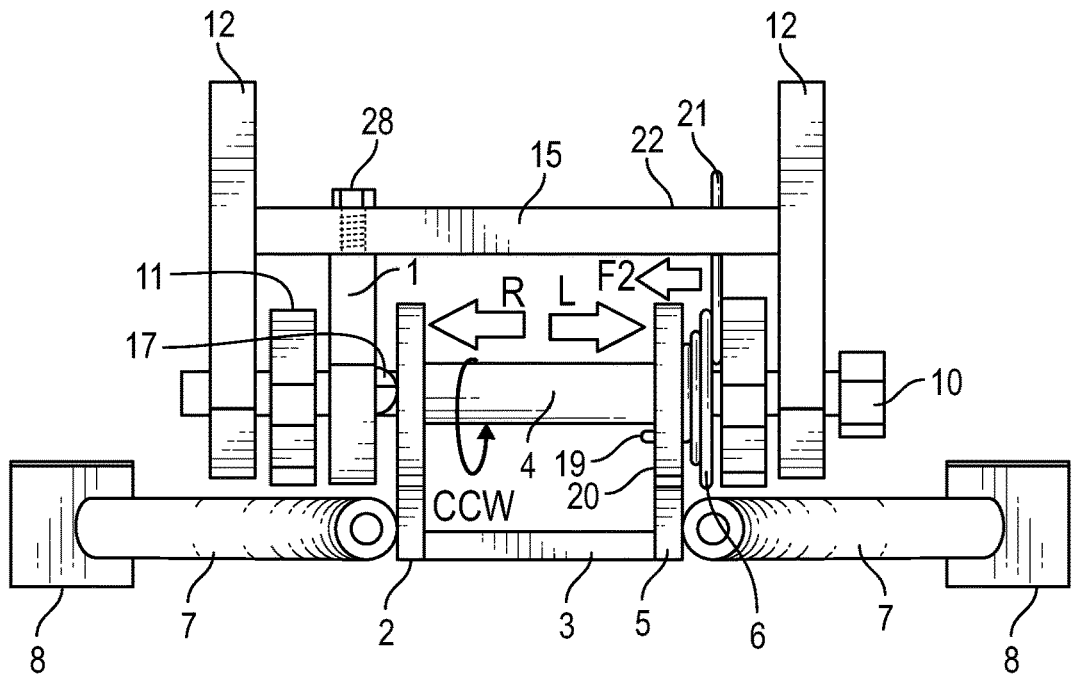
FIG. 8b illustrates a same view of the center kickstand as shown in FIG. 8a, with legs of the center kickstand moved toward a legs-retracted position and the effect of this action.

FIG. 8b illustrates a same view of the center kickstand as shown in FIG. 8a, with legs of the center kickstand moved toward a legs-retracted position and the effect of this action. In particular, FIG. 8b shows the same overhead view as in FIG. 8a with the rotatable apparatus (shown in FIG. 7a) rotated about the shared, pivot axle (10). As shown in FIG. 8b, the rotatable apparatus is rotated in a counter-clockwise direction (CCW) and results with the legs (7) swung toward the legs-retracted position. Thereupon, the sunken relief features (24, shown in FIG. 7c) of the flange (2), in a rotary capacity, push against the dome shape of the high relief features (17) upon which the flange (2) moves away from such pressure in the L direction and creates a gap between the stationary component (1) and the flange (2). This movement is carried through upon the whole of the rotatable apparatus and the flange (5) compresses the spring (6) against the mainframe (11).

Figures 9A, 9B:
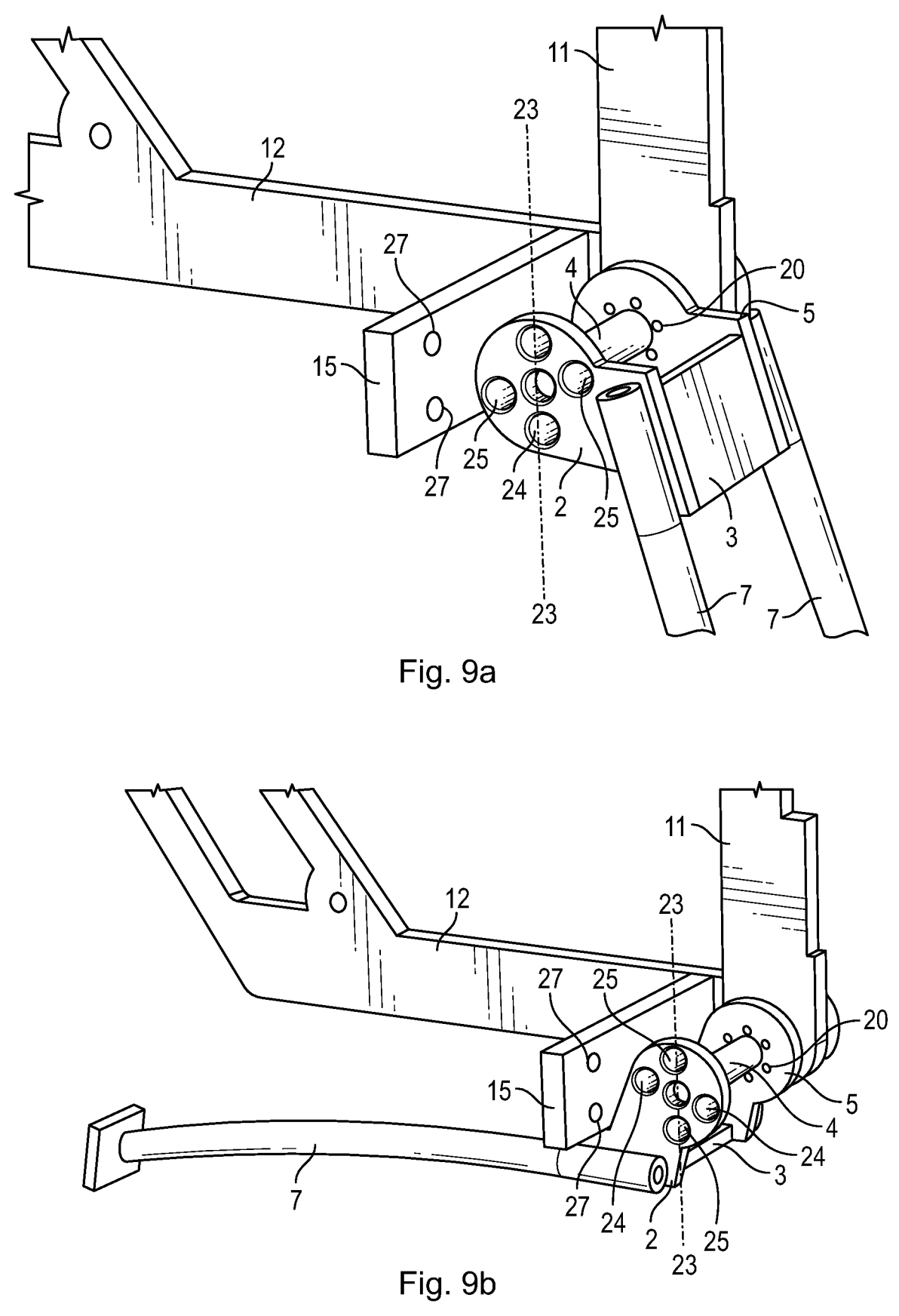

FIG. 9a illustrates another view of the center kickstand shown in FIG. 7a, with legs of the center kickstand deployed and with ancillaries and components not shown, according to an example embodiment. In particular, FIG. 9a shows a front-side view of the center kickstand with some components removed and the legs (7) in the deployed position. When the legs (7) reach a lowermost travel limit, the sunken relief features (24) of the flange (2) are bisected at the center points with the vertical plane (23-23) and correspond to the high relief features (17, shown in FIG. 7b) on the vertical plane (23-23). By the force (F2, shown in FIG. 8a) of the spring (6, shown in FIG. 8a), the high relief features (17) seat with the sunken relief features (24).

FIG. 9b illustrates a same view of the center kickstand as shown FIG. 9a, with legs of the center kickstand shown in a retracted position and resulting differences of features of one component. In particular, FIG. 9b shows the same view as FIG. 9a with the legs (7) in the retracted position. When the legs (7) reach an uppermost travel limit, the sunken relief features (25) are bisected at the center points by the vertical plane (23-23) and correspond to the high relief features (17, shown in FIG. 7b) on the vertical plane (23-23). By the force of the spring (F2, shown in FIG. 8a), the high relief features (17) seat with the sunken relief features (24). The force of the spring (6) can maintain a contiguous relationship of the stationary component (1) and the flange (2) regardless of a positioning of the legs (7) or at what point the legs (7) are travelling.

Figure 10A:
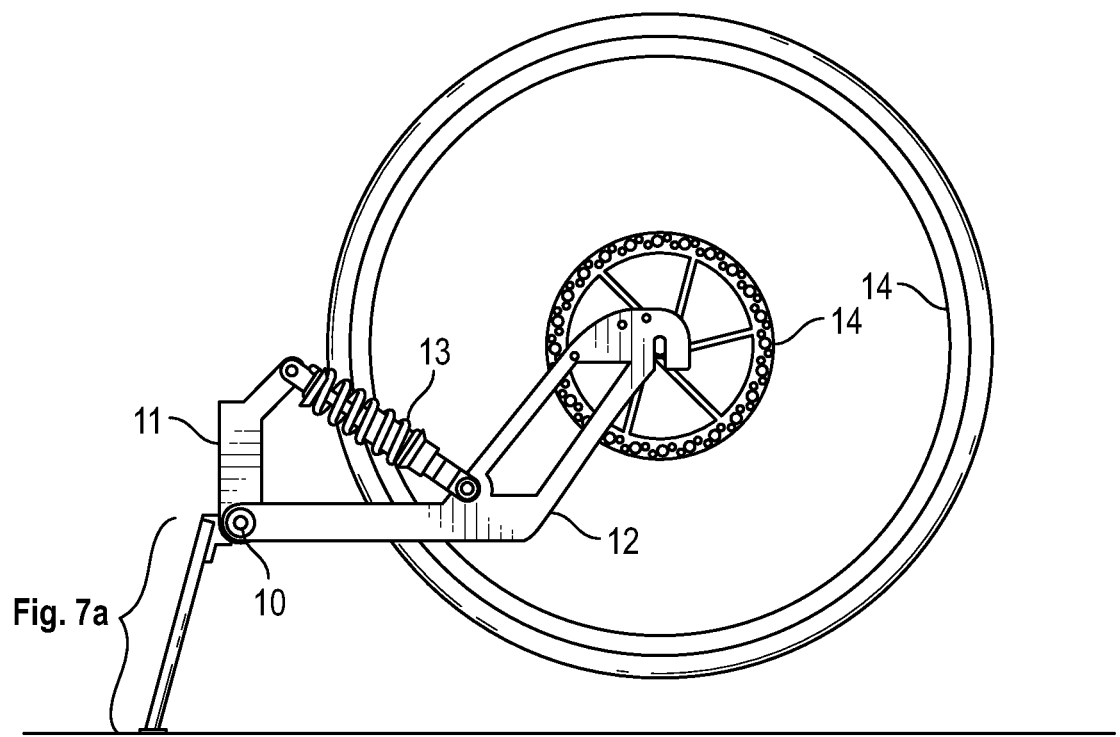
FIG. 10a illustrates a side view of a center kickstand with legs of the center kickstand shown in a deployed position and supporting a parked vehicle, in accordance with an example embodiment.

FIG. 10a illustrates a side view of the center kickstand with legs (7) of the center kickstand shown in a deployed position and supporting a parked vehicle, in accordance with an Example embodiment. In particular, FIG. 10a shows a side view of the center kickstand with the mainframe cut away and the rotatable apparatus (FIG. 7a) in the legs-deployed position and supporting the two-wheeled vehicle in an upright, non-leaning orientation. A rear wheel assembly (14) and a shock absorber (13) are shown for reference.

Figure 10B:
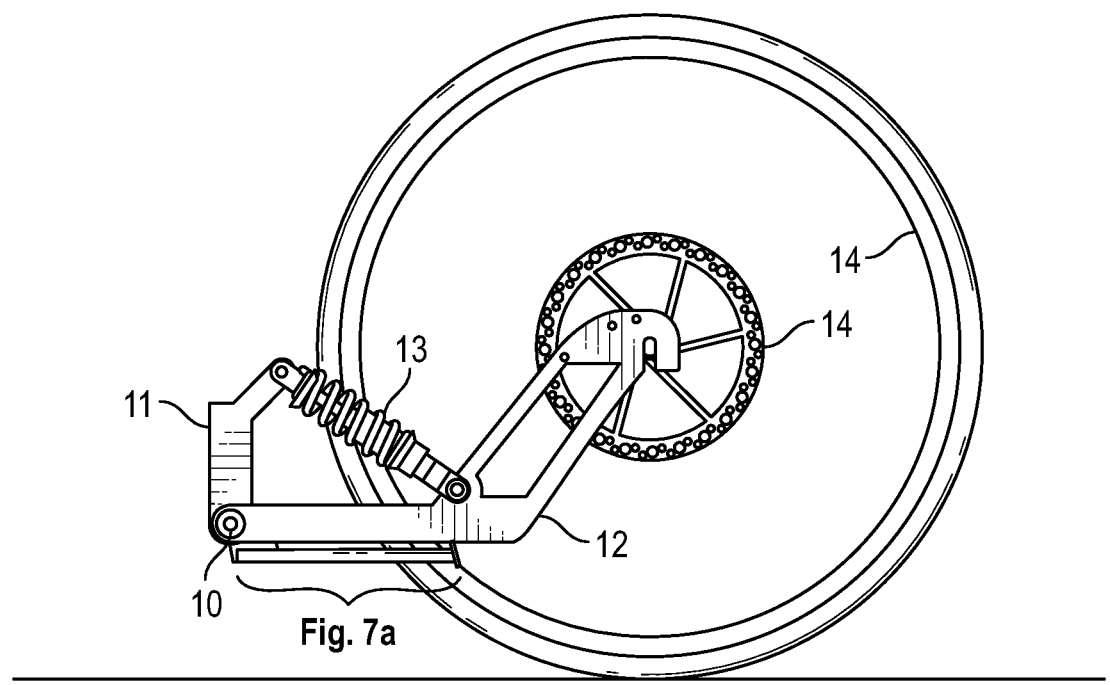
FIG. 10b illustrates a same view of the center kickstand as shown in FIG. 10a, with the vehicle stationary and with the legs in a retracted position, in accordance with an example embodiment.

FIG. 10b illustrates a same view of the center kickstand as shown in FIG. 10a, with the vehicle stationary and with the legs in a retracted position, in accordance with an example embodiment. In particular, FIG. 10b shows a view of the rotatable apparatus (FIG. 7a) in the legs-retracted position and the two-wheeled vehicle being in a ready-to-ride state.

Figure 11A:
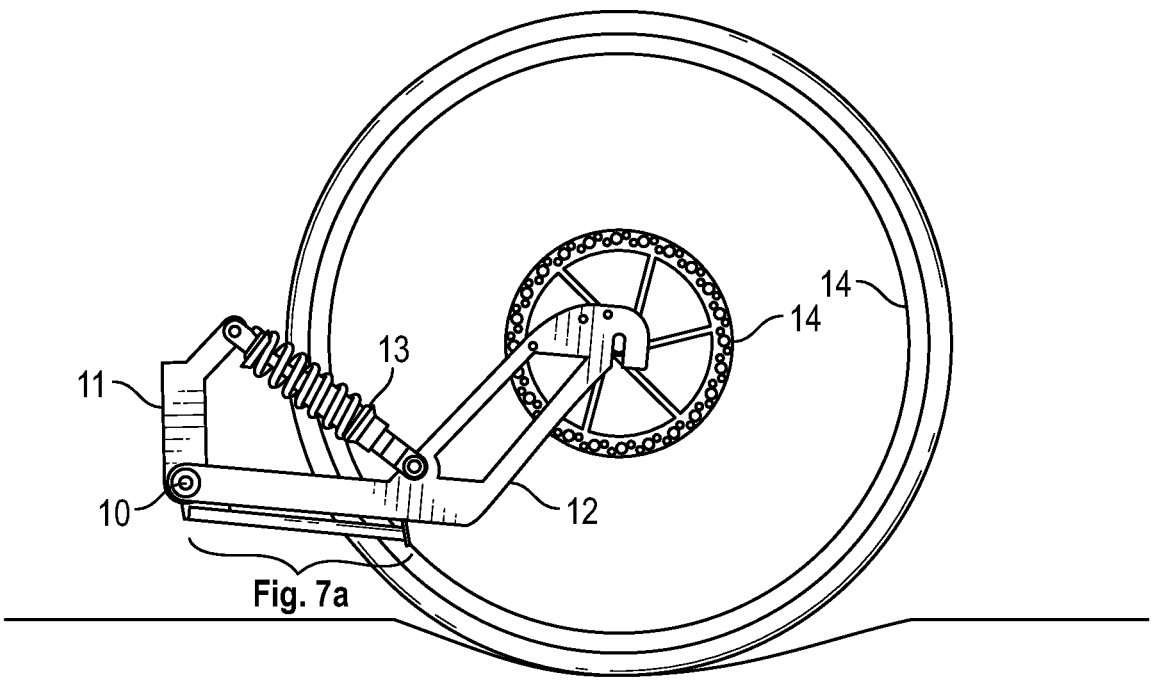
FIG. 11a illustrates a same view of the center kickstand as shown in FIG. 10b while the vehicle is in use, and a reaction of the swing arm and center kickstand to a dip in a roadway according to an example embodiment.

FIG. 11a illustrates a same view of the center kickstand as shown in FIG. 10b while the vehicle is in use, and a reaction of the swing arm and center kickstand to a dip in a roadway according to an example embodiment. In particular, FIG. 11a shows a view of the two-wheeled vehicle in motion and the swing arm (12) and the rotatable apparatus (FIG. 7a) reacting in unison to a deviation in the roadway such as a pothole.

Figure 11B:
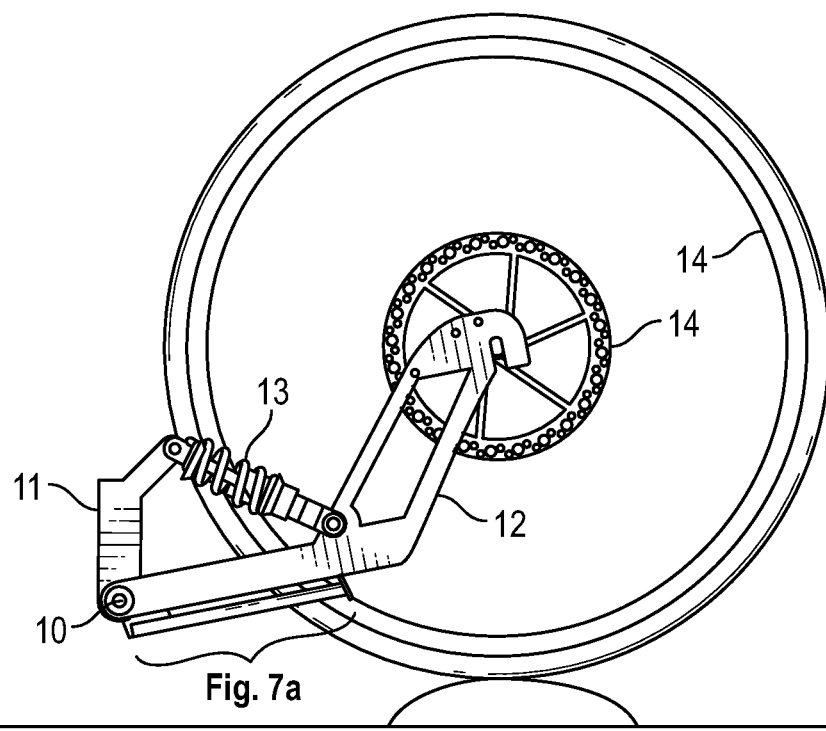
FIG. 11b illustrates a same view of the center kickstand as shown in FIG. 11a, with a reaction of the swing arm and center kickstand to a bump in the roadway according to an example embodiment.

FIG. 11b illustrates a same view of the center kickstand as shown in FIG. 11a, with a reaction of the swing arm and center kickstand to a bump in the roadway according to an example embodiment. In particular, FIG. 11b shows a view with the swing arm (12) and the rotatable apparatus (FIG. 7a) reacting in unison to a bump, or similar, in the roadway.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the disclosure herein, aspects of which are defined in the claims. Furthermore, different aspects of one embodiment herein may be applied to or combined with other embodiments herein.

What is claimed is:

1. A center mounted kickstand for a two-wheeled vehicle with a swing arm rear suspension, comprising:
   a rotatable apparatus; and
   a pivot axle,
   wherein the rotatable apparatus is mounted onto a mainframe of the two-wheeled vehicle via the pivot axle, and the pivot axle is mounted transversely to a longitudinal plane of the two-wheeled vehicle and connects the swing arm to the two-wheeled vehicle, and
   wherein the rotatable apparatus is constructed to slide in both directions transverse the longitudinal plane of the two-wheeled vehicle on the pivot axle.

2. The center mounted kickstand according to claim 1, further comprising:
   a rotatable, cylindrical shaft having a first end and a second end;
   a first flange and a second flange respectively mounted to the first end and the second end of the rotatable, cylindrical shaft, wherein the first flange includes a first pair of sunken relief features and a second pair of sunken relief features;
   a strengthening brace mounted between the first flange and the second flange; and
   a first leg and a second leg, each including a first end and a second end, wherein a foot is provided at the first end of each of the first leg and second leg, and the second end of each of the first leg and the second leg is connected to the first flange and the second flange, respectively, thereby acting as a single unit which is pivotable about an axis of the pivot axle.

3. The center mounted kickstand according to claim 2, wherein in a first positioning in which the first leg and the second leg are at an uppermost point of the swing of the first leg and the second leg, the first leg and the second leg are constructed to be positioned out of the way for the operable use of the two-wheeled vehicle, and
   wherein in a second positioning in which the first leg and the second leg are at a lowermost point of the swing of the first leg and the second leg, the first leg and the second leg are constructed to be positioned for use and to operate as a means to support the two-wheeled vehicle in an upright, non-leaning orientation while the two-wheeled vehicle is parked.

4. A two-wheeled vehicle comprising:
   the center mounted kickstand according to claim 2; and
   a stationary component in relation to and contiguous to the rotatable apparatus of which one end is mounted on a cross member of the swing arm, wherein the stationary component extends forward beyond the axis of the pivot axle and encircles the axis of the pivot axle without having contact with the pivot axle,
   wherein the stationary component has a congruent shape to the first flange, and has two high relief, dome-shaped features which are spaced 180 degrees apart and correspond in size, shape and spacing to the first pair of sunken relief features of the first flange when the first leg and the second leg are in the first positioning, and correspond to the second pair of sunken relief features in size, shape and spacing when the first leg and the second leg are in the second positioning, which lock a position of the rotatable apparatus in place in the respective positioning.

5. The two-wheeled vehicle according to claim 4, further comprising:
a spring constructed to operate as a torsion spring with a force exerted by a winding of the spring, the force being greater than a weight of the first leg and the second leg of the rotatable apparatus, and constructed to operate as a linear compression spring with a force for maintaining a mating of the high relief and sunken relief features between the first flange and the stationary component in either the first positioning or the second positioning.

* * * * *